S. A. D. McGOVERN.
DRAFT BAR FOR HARROWS.
APPLICATION FILED JAN. 16, 1909.
952,210.
Patented Mar. 15, 1910.
2 SHEETS—SHEET 2.
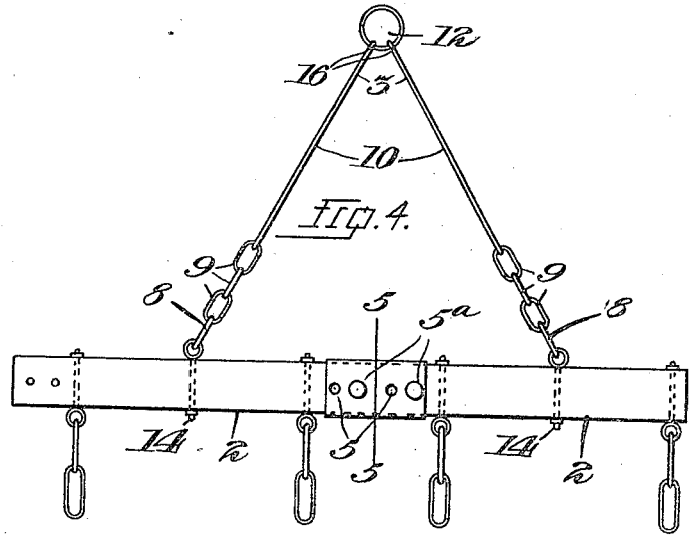
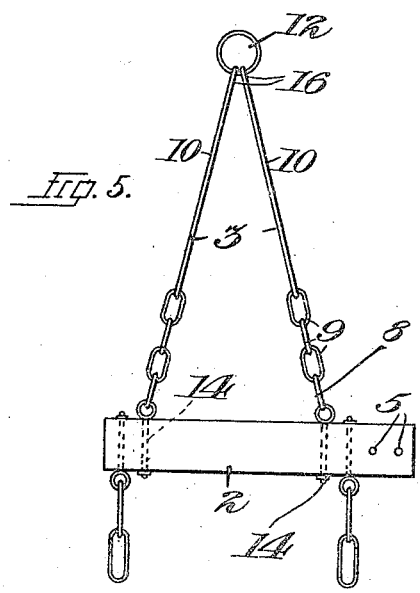
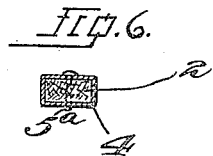
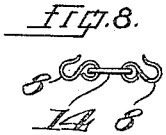
Witnesses,
Inventor.
Stephen A. D. McGovern,
By H. W. Richards,
Attorney.

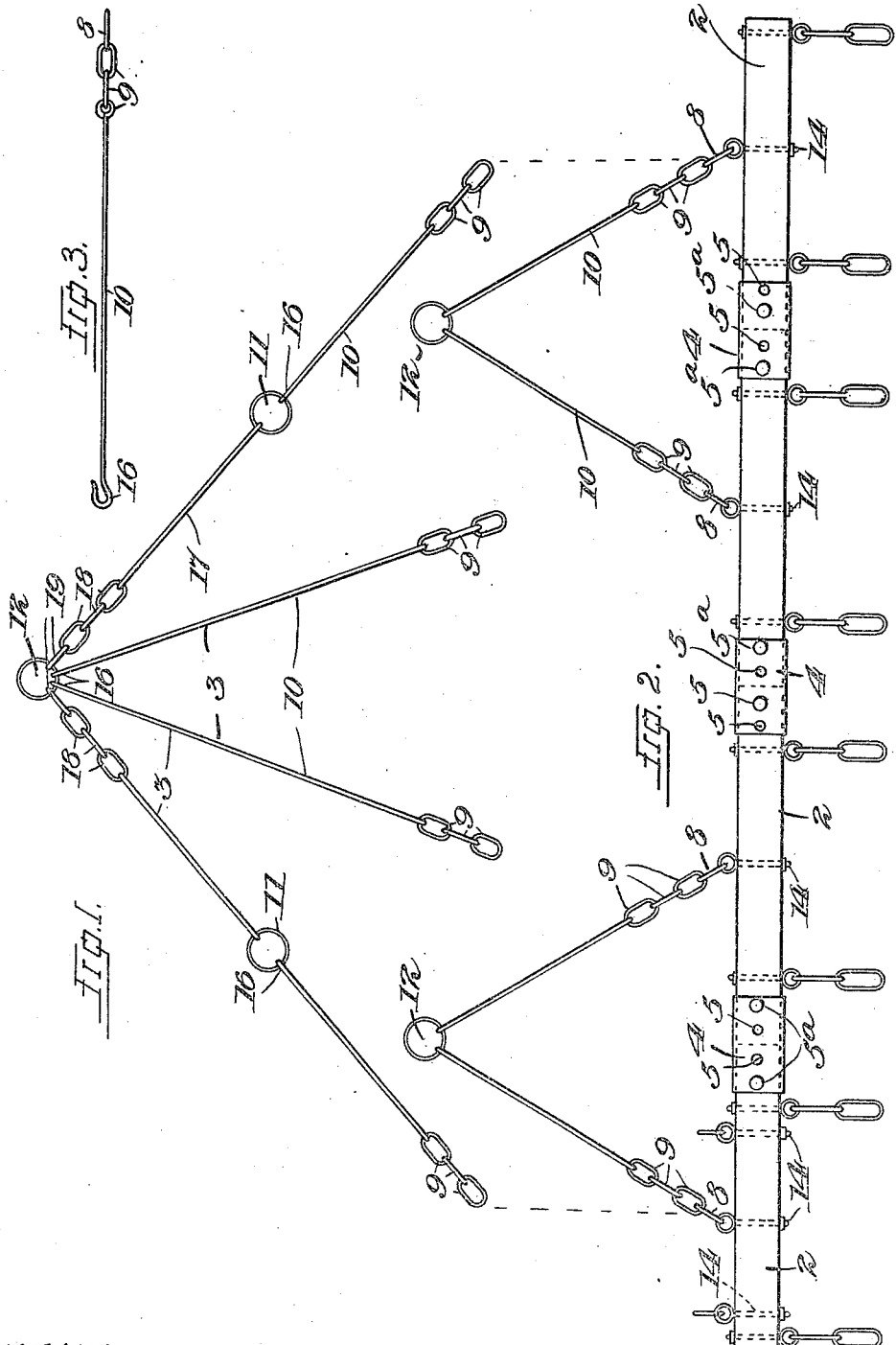

UNITED STATES PATENT OFFICE.

STEPHEN A. D. McGOVERN, OF ONEIDA, ILLINOIS.

DRAFT-BAR FOR HARROWS.

952,210.

Specification of Letters Patent. Patented Mar. 15, 1910.

Application filed January 16, 1909. Serial No. 472,707.

*To all whom it may concern:*

Be it known that I, STEPHEN A. D. MC-GOVERN, a citizen of the United States, and a resident of Oneida, in the county of Knox and State of Illinois, have invented certain new and useful Improvements in Draft-Bars for Harrows, of which the following is a specification.

My invention relates primarily to means for separably connecting the several sections of the drag-bar of a multiple harrow, and to the means whereby the draft animals may be attached to any number of said sections.

The objects of the invention are to provide a simple, strong, economic keeper or connection which may be quickly and easily applied to the abutting ends of two of the harrow sections to secure them rigidly together, and which may as readily be removed therefrom to disengage them; and further, to provide improved means whereby either section, or any preferred number thereof may be drawn by the same draft mechanism or parts thereof, whether for passing through gates, through narrow lanes, over bridges, for local transportation, or for operation in a field.

To the end of accomplishing these objects the invention consists in constructions and combinations hereinafter described.

In the accompanying drawings, which illustrate a preferred embodiment of my invention: Figure 1 illustrates a selective draft mechanism; Fig. 2, a plan, illustrating, when taken in connection with Fig. 1, a mode not only of the means of attachment, but further, the means of securement together of the harrow draft-bar sections; Fig. 3, a detail, showing one of the central rods comprising the four way hitching means; Fig. 4, a modification, showing how the central rods may be applied to a two section harrow; Fig. 5, a similar view, showing how the same rods are attachable to a single harrow section; Fig. 6, a vertical, central sectional elevation, taken in the line 5—5 in Fig. 4; Fig. 7, a detail of one of the hook members shown in plan view throughout the principal figures; and Fig. 8, a detail, showing a modified construction thereof, or of the rear end connection of the means of attachment to the respective harrow sections.

Referring to the drawings, 2, 2, 2, 2 represent individual sections of the drag-bar of a toothed harrow which may be of any ordinary construction. Suitable means of attachment thereto, 3, which may also be of any preferred construction, are also shown—
(see Figs. 1, 2, 3, 4 and 5.)

Connecting the proximal ends of each pair of harrow sections is a tubular keeper 4, preferably of rectangular form in its cross-section. The keepers are adapted to fit snugly over the abutting ends of the sections, and each is provided with apertures 5, through which pins (5ª, shown best at Fig. 6) may be passed to interlock with selective apertures in the ends of said sections. Transversely through the respective sections 2 are passed eye-bolts 14, the eye of each of which is forward of the section to which it is attached. To these eyes are attachable by hooks 8 flexibly connected by a link or links 9, rods 10, each of the outer pair of which has at its forward end a hook 16 adapted for engagement with a ring 11, and the inner pair of which rods, being elongated, are adapted to engage a main ring 12. Intermediate each pair of rings 11 and 12 is a flexible connection comprising a rod 17, links 18 and a hook 19.

When it is necessary to pass through a very narrow space, the means shown at Fig. 5, comprising the elongated rods 10, links 9 and hooks 8 are engaged with a single harrow-section, the keeper 4 having been removed therefrom. Two sections may be drawn by the means shown at Fig. 4, in which one of the keepers is employed to rigidly secure the sections in alinement by the act of dropping one of the pins through each of the apertures in the keeper and in the proximal ends of the sections, (selective spacing being effected in an evident manner) the same draft means being employed as shown at Fig. 5, but the eye-bolts 14 positioned elsewhere in the draft bars from what is there shown. If it be desired to draw three sections (see Fig. 1 in connection with Fig. 2,) the outer links 9 are engaged with the eye-bolts in the outer sections 2, preferably by means of an interposed link and a double hook 8, see Fig. 8, and the elongated rods 10 are engaged with the central section in the manner shown at Fig. 5. Four sections may be united as shown at Fig. 2 and drawn by the means shown at Fig. 1. Any of the hooks, it will be apparent, may be instantly engaged or disengaged, and there will be no necessity of carrying even a single tool, as no bolts or nuts are to be applied or removed in assembling or disassembling the several sections.

It will be manifest and is well known to those who are skilled in the art of agriculture, that when it is desirable to pass through gates, when it is necessary to cross bridges or when it is required to locally transport a sectional harrow, my improvements will be found to be not only desirable but essential. Furthermore, it will be clear that a rigid connection is furnished by the keepers 4, whereby, when draft is applied to either end of the multiple draft or drag-bar the latter will not flex but each section thereof will be drawn in a line with relation to the other sections thereof. The drag bars are, by means of the hooks, readily detachable, and a single section or any number thereof may, virtually, instantly and selectively be employed.

Having thus described my invention, I claim as new and as said invention:

1. A draft-bar for harrows comprising a plurality of sections, a tubular keeper provided with a series of apertures, inclosing and uniting the abutting ends of said sections, pins adapted for engagement with selective ones of said apertures, whereby said sections may be lineally spaced, eye-bolts fixed transversely of each section, hooks removably engaged therewith, a main draft-ring, and selective means interposed between said ring and hooks whereby a predetermined number of sections may be drawn by means of said ring.

2. A draft-bar for harrows comprising a plurality of sections, means for lineally uniting their proximal portions, an eye-bolt fixed transversely of each of said sections, a main draft-ring, intermediate draft-rods having each a hooked end adapted to engage said ring, links secured to the other end of said rods and removably engaged with said eye-bolts, outer rods in pairs having each a hooked end, a ring flexibly connecting the proximal ends of said outer rods, a flexible connection at the outer ends of each of said outer rods, and means for releasably engaging said connections with the main draft-ring.

In witness that I claim the foregoing as my invention, I hereto subscribe my name in presence of two witnesses.

STEPHEN A. D. McGOVERN.

Witnesses:
   CHAS. S. HARRIS,
   WEBB A. HERLOCKER.